United States Patent
Huang et al.

(10) Patent No.: US 9,626,733 B2
(45) Date of Patent: Apr. 18, 2017

(54) DATA-PROCESSING APPARATUS AND OPERATION METHOD THEREOF

(71) Applicant: Industrial Technology Research Institute, Hsinchu (TW)

(72) Inventors: Hsu-Yao Huang, Tainan (TW); I-Hsuan Lu, Hsinchu (TW); Tai-Hua Lu, Taichung (TW); Shau-Yin Tseng, Hsinchu County (TW); Juin-Ming Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 86 days.

(21) Appl. No.: 14/551,089

(22) Filed: Nov. 24, 2014

(65) Prior Publication Data

US 2016/0148335 A1     May 26, 2016

(51) Int. Cl.
    *G06T 1/20*     (2006.01)

(52) U.S. Cl.
    CPC ..................... *G06T 1/20* (2013.01)

(58) Field of Classification Search
    CPC ......... G06T 7/00; G06T 7/0026; G06T 7/003; G06T 7/2013; G06T 7/204; G06T 11/40; H04N 5/144; H04N 19/119; H04N 19/51
    USPC ........................................................ 345/501
    See application file for complete search history.

(56) References Cited

U.S. PATENT DOCUMENTS

| | | | |
|---|---|---|---|
| 5,867,166 A * | 2/1999 | Myhrvold | G06T 11/001 345/419 |
| 6,380,935 B1 | 4/2002 | Heeschen et al. | |
| 7,068,272 B1 | 6/2006 | Voorhies et al. | |
| 7,184,041 B2 | 2/2007 | Heng et al. | |
| 8,269,775 B2 * | 9/2012 | Bourd | G06T 11/203 345/442 |

(Continued)

FOREIGN PATENT DOCUMENTS

| | | |
|---|---|---|
| CN | 100397424 | 6/2008 |
| TW | 200424953 | 11/2004 |

(Continued)

OTHER PUBLICATIONS

Tom Olson, "How low can you go? Building low-power, low-bandwidth ARM Mali GPUs" ARM Connected Community, http://community.arm.com/groups/arm-mali-graphics/blog/2012/08/17/how-low-can-you-go-building-low-power-low-bandwidth-arm-mali-gpus, Aug. 17, 2012, pp. 1-8.

(Continued)

*Primary Examiner* — Ulka Chauhan
*Assistant Examiner* — Sae Won Yoon
(74) *Attorney, Agent, or Firm* — Jianq Chyun IP Office

(57) ABSTRACT

A data-processing apparatus and an operation method thereof are provided. The data-processing apparatus includes a tiling circuit and a post-stage processing circuit. The tiling circuit is configured to receive input data. The tiling circuit divides a current frame of the input data into at least one tile and checks a motion state of the current tile in the at least one tile. The post-stage processing circuit is coupled to the tiling circuit to receive the current tile. The post-stage processing circuit performs post processing on the current tile to generate a processed current tile of the current frame or to obtain a processed corresponding tile of a previous frame and serves it as the processed current tile of the current frame, according to the motion state of the current tile.

13 Claims, 6 Drawing Sheets

(56) References Cited

U.S. PATENT DOCUMENTS

| | | | |
|---|---|---|---|
| 8,310,491 B2 | 11/2012 | Swift et al. | |
| 8,711,155 B2 | 4/2014 | Hutchins et al. | |
| 2005/0231504 A1 | 10/2005 | Heng et al. | |
| 2007/0064805 A1* | 3/2007 | Carrig | H04N 19/567 375/240.16 |
| 2007/0083815 A1 | 4/2007 | Delorme et al. | |
| 2007/0120858 A1* | 5/2007 | Meinds | G06T 13/20 345/473 |
| 2007/0182748 A1* | 8/2007 | Woo | G06T 15/005 345/506 |
| 2008/0112489 A1* | 5/2008 | Malladi | H04N 19/176 375/240.22 |
| 2008/0291198 A1* | 11/2008 | Chun | G06T 15/005 345/419 |
| 2010/0008424 A1* | 1/2010 | Pace | H04N 19/14 375/240.16 |
| 2011/0074765 A1 | 3/2011 | Oterhals et al. | |
| 2011/0102446 A1 | 5/2011 | Oterhals et al. | |
| 2011/0148876 A1 | 6/2011 | Akenine-Moller et al. | |
| 2011/0148919 A1 | 6/2011 | Heggelund et al. | |
| 2012/0044245 A1 | 2/2012 | Diril et al. | |
| 2012/0162454 A1* | 6/2012 | Park | H04N 5/145 348/208.6 |
| 2012/0176386 A1* | 7/2012 | Hutchins | G06T 1/20 345/522 |
| 2012/0236002 A1* | 9/2012 | Bi | G06T 15/005 345/427 |
| 2012/0236011 A1 | 9/2012 | Diesi | |
| 2012/0268480 A1 | 10/2012 | Cooksey et al. | |
| 2013/0142396 A1* | 6/2013 | Fletcher | G06T 7/004 382/106 |
| 2013/0230099 A1* | 9/2013 | DeForest | H04N 19/00569 375/240.08 |
| 2013/0343460 A1* | 12/2013 | Itani | H04N 19/55 375/240.16 |
| 2014/0118568 A1* | 5/2014 | Moon | H04N 5/23254 348/208.6 |
| 2014/0161367 A1* | 6/2014 | Ridenour | H04N 19/115 382/233 |
| 2014/0192053 A1* | 7/2014 | Bi | H04N 13/0278 345/426 |
| 2014/0267318 A1 | 9/2014 | Lum et al. | |
| 2014/0354682 A1* | 12/2014 | Heggelund | G06T 1/20 345/619 |
| 2014/0355892 A1* | 12/2014 | Moon | G06K 9/6215 382/220 |
| 2015/0030074 A1* | 1/2015 | Nakagami | H04N 19/44 375/240.16 |
| 2015/0091892 A1* | 4/2015 | Kwon | G06T 15/005 345/419 |
| 2015/0222730 A1* | 8/2015 | Gower | G06F 9/542 709/203 |
| 2015/0379727 A1* | 12/2015 | Golas | G06T 1/20 382/103 |

FOREIGN PATENT DOCUMENTS

| | | |
|---|---|---|
| TW | 200945247 | 11/2009 |
| TW | 201337733 | 9/2013 |
| TW | 201435797 | 9/2014 |

OTHER PUBLICATIONS

Chang et al., "Fragment Reduction on Mobile GPU with Content Adaptive Sampling," 2012 IEEE International Conference on Multimedia and Expo Workshops, Jul. 9-13, 2012, pp. 629-634.

Imagination Technologies Ltd., "Deferred Rendering," POWERVR Series5 Graphics SGX architecture guide for developers, Jan. 14, 2012, pp. 1-50.

Vasilakis et al., "Depth-Fighting Aware Methods for Multifragment Rendering," IEEE Transactions on Visualization and Computer Graphics, Jun. 2013, pp. 967-977.

Dayal et al., "Adaptive Frameless Rendering," Northwestern University Computer Science Department Technical Report NWU-CS-05-07, Apr. 26, 2005, pp. 1-12.

Ragan-Kelley et al., "Decoupled Sampling for Graphics Pipelines," ACM Transactions on Graphics, May 2011, pp. 17-17:17.

Liang et al., "Computation-Effective 3-D Graphics Rendering Architecture for Embedded Multimedia System," IEEE Transactions on Consumer Electronics, Aug. 2000, pp. 735-743.

Huang et al, "Inter Frame Tile Elimination Method for Graphics Processing Unit," CVGIP'14, Aug. 2014, pp. 1-6.

Blythe et al., "OpenGL ES Common/Common-Lite Profile Specification Version 1.1.12 (Full Specification)," The Khronos Group Inc., Apr. 24, 2008, pp. 1-179.

"Office Action of Taiwan Counterpart Application", issued on Nov. 30, 2015, p. 1-p. 6.

* cited by examiner

DATA-PROCESSING APPARATUS AND OPERATION METHOD THEREOF

TECHNICAL FIELD

The disclosure is relates a data-processing apparatus and an operation method thereof.

BACKGROUND

At present, a graphics processing unit (GPU) is advanced to be capable of processing a giga-level, i.e., processing gigabits of drawing commands per second. The trends of computer graphics are toward larger resolution images (e.g., 4K by 4K) and complex rendering. However, for some computation platforms (e.g., handheld devices), having powerful computation capabilities (accompanying with great power consumption) and large bandwidth is not realistic. A tiling engine may be equipped in the GPU of a handheld electronic device, and divide an image into a plurality of tiles. A tile-based rendering architecture can contribute to utilizing and accessing a local memory, and the usage of the bandwidth can be more efficiently.

How to reduce the transmission the bandwidth between the GPU and the system, and/or save the computation of a graphics rendering pipeline in the GPU is a subject in the field. In some current techniques, an Adaptive Scalable Texture Compress (ASTC) and a Transaction Elimination techniques are utilized to reduce the bandwidth between the GPU and the system, and achieve the reduction of power consumption. ASTC is a compress technique utilizing illumination of texture color. The "Transaction Elimination" technique can be utilized to compare rendered pixels in a current frame with rendered pixels located at the same positions in a previous frame, and save the bandwidth. In the current techniques, the transaction elimination is performed after the pixels are rendered, i.e., after a stage of rasterization is finished. Namely, the transaction elimination has to be performed on the pixels after the rendering computation. Therefore, the effect of saving the computation in the graphics rendering pipeline of the current techniques is limited.

SUMMARY

A data-processing apparatus and an operation method thereof to save computation of tiles as early as possible in a data-process apparatus are introduced herein.

According to an embodiment of the disclosure, a data-processing apparatus is introduced. The data-processing apparatus includes a tiling circuit and a post-stage processing circuit. The tiling circuit is configured to receive input data, divide a current frame of the input data into at least one tile and check a motion state of a current tile among the at least one tile. The post-stage processing circuit is coupled to the tiling circuit to receive to receive the current tile. The post-stage processing circuit determines to perform a post processing that comprising rasterizing on the current tile to generate a processed current tile of the current frame or to obtain a processed corresponding tile of a previous frame to serve the processed corresponding tile of the previous frame as the processed current tile of the current frame, according to the motion state of the current tile.

According to an embodiment of the disclosure, an operation method of a data-processing apparatus is introduced. The operation method includes: dividing a current frame of input data into at least one tile by a tiling module; checking a motion state of the current tile among the at least one tile by the tiling module; and determining to perform a post processing that comprising rasterizing on the current tile by a post-stage processing module to generate a processed current tile of the current frame or to obtain a processed corresponding tile of a previous frame by the post-stage processing module to serve the processed corresponding tile of the previous frame as the processed current tile of the current frame, according to the motion state of the current tile.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
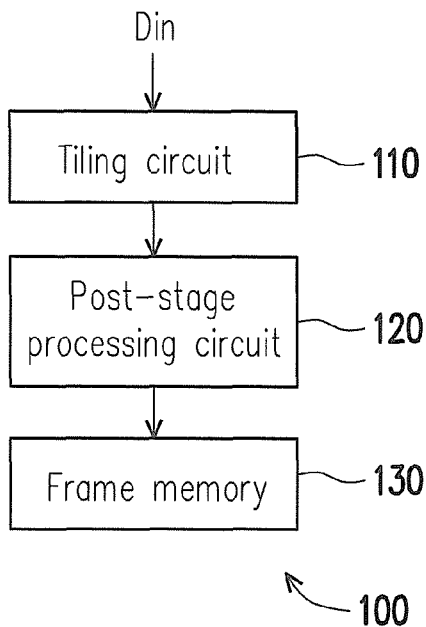
FIG. 1 is a schematic diagram illustrating a data-processing apparatus according to an embodiment of the disclosure.

In the following detailed description, for purposes of explanation, numerous specific details are set forth in order to provide a thorough understanding of the disclosed embodiments. It will be clear, however, that one or more embodiments may be practiced without these specific details. In other instances, well-known structures and devices are schematically shown in order to simplify the drawing. It is clear in the related art of the disclosure that the so called "module" could be implemented by at least one of hardware circuit, software, firmware, or any combination of two or more of selected from hardware circuit, software, and firmware.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

Figure 2:
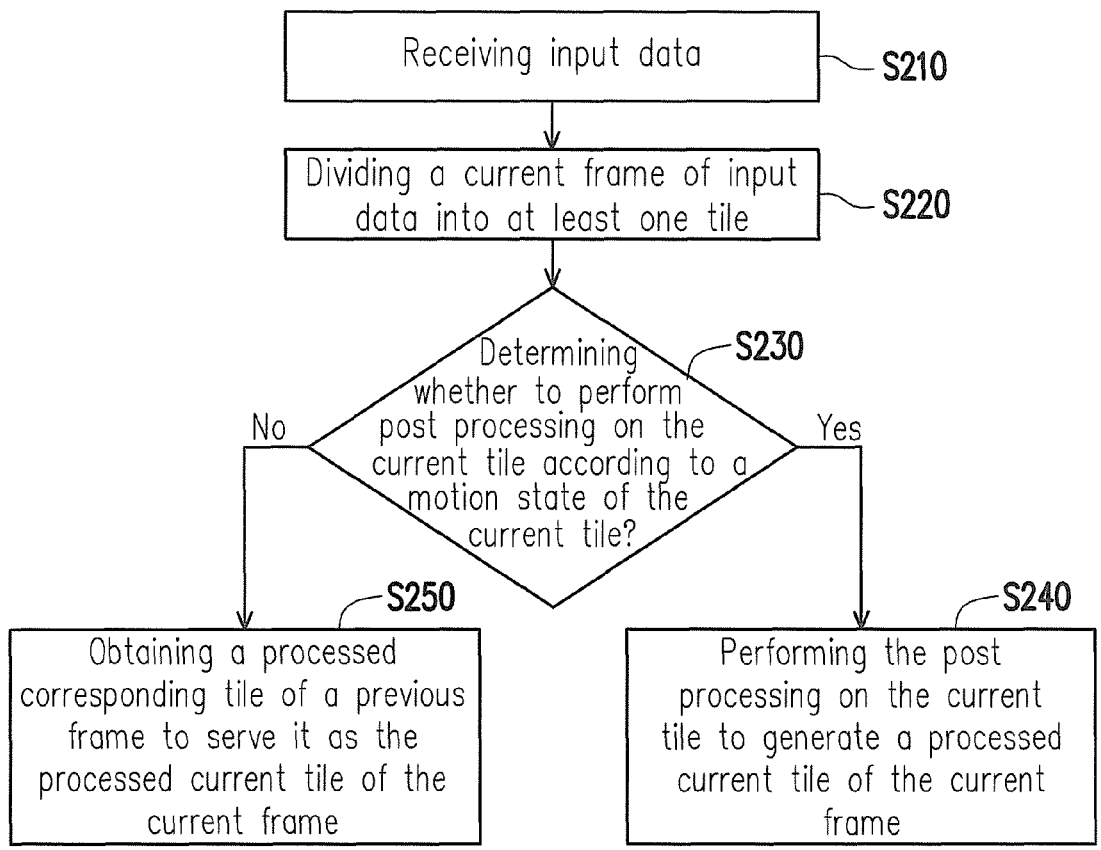
FIG. 2 is a flowchart illustrating an operation method of a data-processing apparatus according to an embodiment of the disclosure.

FIG. 1 is a schematic diagram illustrating a data-processing apparatus 100 according to an embodiment of the disclosure. The data-processing apparatus 100 includes a tiling module (e.g., a tiling circuit 110), a post-stage processing module (e.g., a post-stage processing circuit 120) and a frame memory 130. FIG. 2 is a flowchart illustrating an operation method of a data-processing apparatus according to an embodiment of the disclosure. With reference to FIG. 1 and FIG. 2, the tiling module (e.g., a tiling circuit 110) is configured to receive input data Din (step S210), and a current frame of the input data Din is divided into one or more tiles (step S220). The tiles may be an entire frame or sub-frames in different embodiments. A size of each tile may be determined according to actual design requirements. The input data Din may include graphics data according to application scenarios of the data-processing apparatus 100.

The tiling circuit 110 is configured to check a motion state of a current tile among the tiles in a current frame. For example, the tiling circuit 110 may determine whether to perform post processing on the current tile according to the motion state of the current tile (step S230). The post-stage processing module (e.g., a post-stage processing circuit 120) is coupled to the tiling circuit 110 to receive the current tile. When the tiling circuit 110 determines according to the motion state of the current tile that the post processing requires to be performed on the current tile, the tiling circuit 110 may determine that the post-stage processing circuit 120 performs the post processing on the current tile, and generate a processed current tile of the current frame (step S240). In some embodiments, if the data-processing apparatus 100 is applied in a graphics processing unit (GPU), the input data Din may include a drawing commands (drawing command), and the post processing performed by the post-stage processing circuit 120 may include a rasterization operation. The rasterization operation is a commonly known technique in the art and will not be repeated described herein.

The post-stage processing circuit 120 may store the processed current tile in the frame memory 130. In this way, the other tiles of the current frame may be processed by the post-stage processing circuit 120, and the processed tiles may be stored in the frame memory 130, and obtain a complete current frame.

When the tiling circuit 110 determines according to the motion state of the current tile that the post processing does not require to be performed on the current tile, the tiling circuit 110 may determine to disable the post processing operation of the post-stage processing circuit 120. In a scenario where the post processing operation of the post-stage processing circuit 120 is disabled, the post-stage processing circuit 120 may obtain a processed corresponding tile of the previous frame from the frame memory 130 and serve the obtained processed corresponding tile of the previous frame as a processed current tile of the current frame (step S250).

Figure 3:
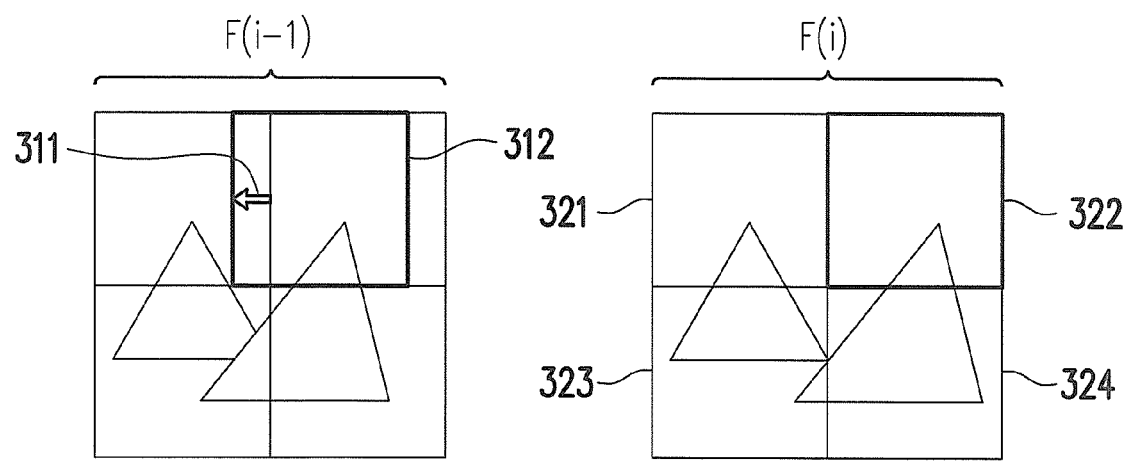
FIG. 3 schematically illustrates the operation of step S250 of FIG. 2 according to an embodiment of the disclosure.

For instance, FIG. 3 schematically illustrates the operation of step S250 of FIG. 2 according to an embodiment of the disclosure. FIG. 3 illustrates a previous frame F(i−1) in the left half and a current frame F(i) in the right half. The previous frame F(i−1) represents an image frame which is processed by the post-stage processing circuit 120 in a previous time period and generated. The post-stage processing circuit 120 may access the previous frame F(i−1) from the frame memory 130. In the example illustrated in FIG. 3, the current frame F(i) includes tiles 321, 322, 323 and 324. It is assumed here that the tile 322 is the current tile. The tiling circuit 110 may check a motion state of the current tile 322 of the current frame F(i). For example, the tiling circuit 110 may search a corresponding tile 312 that is the most similar to the current tile 322 in the previous frame F(i−1) according to the current tile 322 and obtain a motion vector 311. Because the tile 312 of the previous frame F(i−1) is corresponding and similar to the current tile 322 of the current frame F(i), the computation (i.e., the post processing) for the current tile 322 may be omitted. When it is determined that the post processing does not require to be performed on the current tile 322, the post-stage processing circuit 120 may obtain a processed corresponding tile 312 of the previous frame F(i−1) from the frame memory 130 according to the motion vector 311, and serve the obtained tile 312 as the processed current tile 322 of the current frame F(i).

The embodiment illustrated in FIG. 1 and FIG. 2 may be applied to various data processing apparatuses, such as a graphics data processing apparatuses or other data processing apparatuses. An example of a graphics processing unit (GPU) applied to the embodiment illustrated in FIG. 1 and FIG. 2 will be illustrated below.

The GPU is configured with a graphics rendering pipeline. The graphics rendering pipeline is divided into two parts, a geometry processing stage and a fragment processing stage. The geometry processing stage includes a programmable vertex shader/unified shader and a geometry engine. The fragment processing stage includes a programmable fragment shader/unified shader and a rasterization engine.

Figure 4:
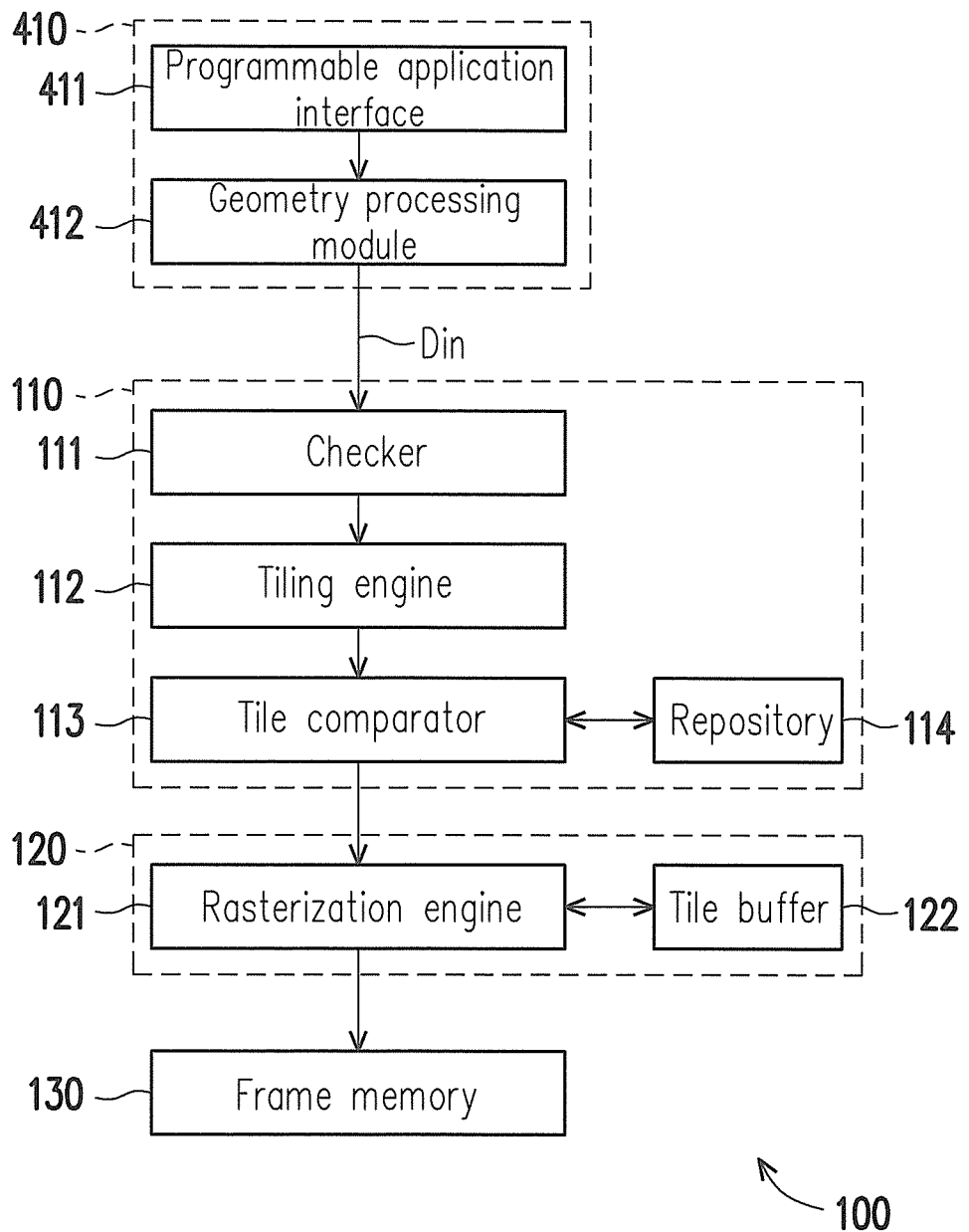
FIG. 4 is a schematic diagram illustrating the data-processing apparatus of FIG. 1 according to an embodiment of the disclosure.

FIG. 4 is a schematic diagram illustrating the data-processing apparatus 100 of FIG. 1 according to an embodiment of the disclosure. The data-processing apparatus 100 illustrated in FIG. 4 further includes a preceding-stage processing module (e.g., a preceding-stage processing circuit 410). The preceding-stage processing circuit 410 is coupled to the tiling circuit 110 to provide the input data Din. The preceding-stage processing circuit 410 includes a programmable application interface 411 and a geometry processing module 412. The geometry processing module 412 may include a programmable vertex shader/unified shader, a geometry engine and/or any other geometry processing module/circuit. The programmable vertex shader/unified shader and the geometry engine may be implemented in any form, for example, a geometry processing module 412 may be implemented by using a programmable vertex shader/unified shader and/or a geometry engine that are currently available in the market.

High-hierarchy computation elements, such as a software compiler, a driver and the like, may be imported into the programmable application interface 411. The programmable application interface 411 may correspondingly generate a drawing command to the geometry processing module 412. When the geometry processing module 412 receives the drawing command accompanying with a corresponding vertex stream, the drawing command is input to the programmable vertex shader and the geometry engine in the geometry processing module 412. The programmable vertex shader may calculate a clip coordinate of each vertex with potential lighting effects. And, the vertices are combined into a primitive. The geometry processing module 412 may correspondingly generate the input data Din according to the drawing command to the tiling circuit 110.

The post-stage processing circuit 120 of the fragment processing stage illustrated in FIG. 4 includes a rasterization engine 121 and a tile buffer 122. Information output by the tiling circuit 110 is fed to a rasterizer in the rasterization engine 121. The rasterization engine 121 may scan the primitive and correspondingly generate corresponding fragments. The fragments referred to herein generally correspond to pixels or part of the pixels on a screen. The programmable fragment shader in the rasterization engine 121 may calculate a color value of each fragment and may use a texture unit during the calculation process. And, the rasterization engine 121 perform a depth test, a stencil test and any other pipeline operation on each fragment according to application setup, and during this process, a tile depth buffer and a tile stencil buffer may be used. A final color value of each fragment is written in to the frame memory 130. The rasterization engine 121 is a commonly known technique in the art and will not be repeated described herein.

Figure 5:
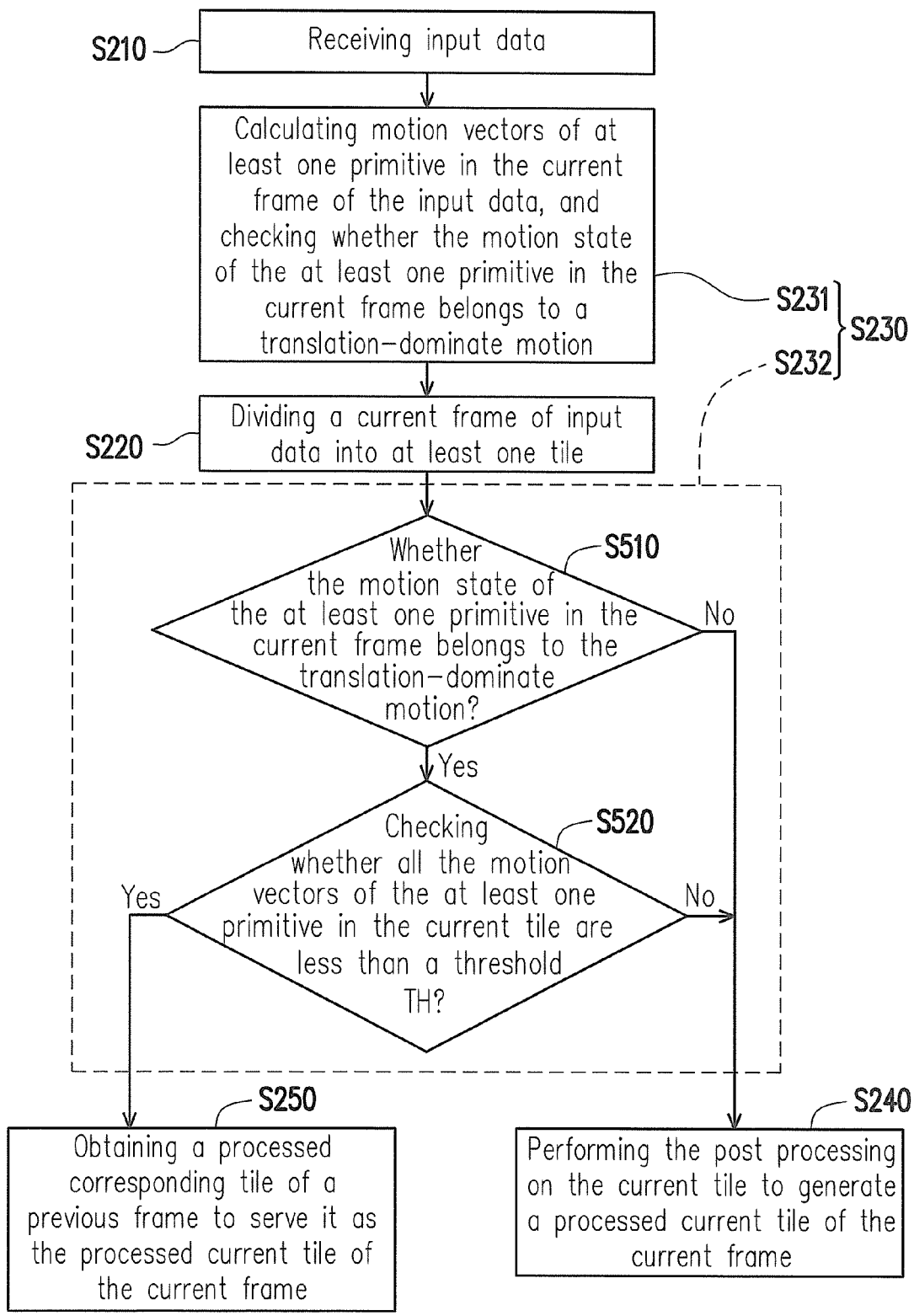
FIG. 5 is a flowchart illustrating the operation method depicted in FIG. 2 according to an embodiment of the disclosure.

FIG. 5 is a flowchart illustrating the operation method depicted in FIG. 2 according to an embodiment of the disclosure, where steps S210, S220, S230, S240 and S250 illustrated in FIG. 5 may be derived with reference to the description related to FIG. 2. In the embodiment illustrated in FIG. 5, step S230 includes sub-steps S231 and S232.

With reference to FIG. 4 and FIG. 5, in step S210, the geometry processing module 412 of the preceding-stage processing circuit 410 performs the preceding-stage processing to provide the input data Din to the tiling circuit 110. For example, the geometry processing module 412 may perform geometric stage processing in the graphics rendering pipeline to output the input data Din containing parameters and geometry data to the tiling circuit 110.

Referring to FIG. 4, the tiling circuit 110 includes a checker 111, a tiling engine 112, a tile comparator 113 and a repository 114. The checker 111 may receive the input data Din provided by the preceding-stage processing circuit 410. The checker 111 is a translation-dominate checker. In steps S231, the checker 111 may calculate a motion vector of a primitive in the current frame of the input data Din and check a motion state of the primitive in the current frame belongs to a "translation-dominate" motion. For instance, the checker 111 may check whether a transformation matrix of the drawing command is "translation-dominate" and correspondingly set a flag in step S231.

Figure 6:
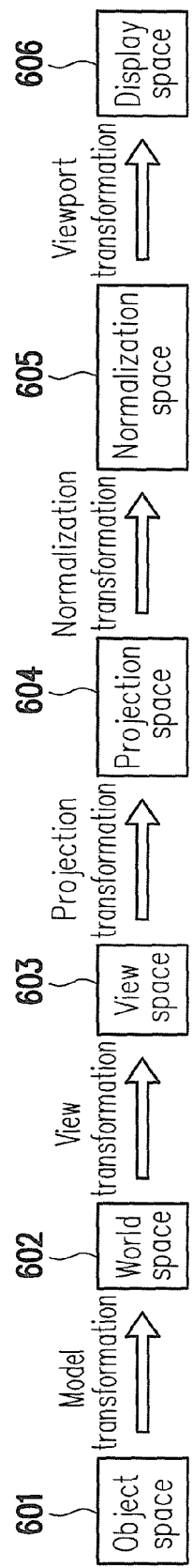
FIG. 6 is a schematic diagram illustrating that different types of spatial transformations are performed on the primitive according to an embodiment of the disclosure.

FIG. 6 is a schematic diagram illustrating that different types of spatial transformations are performed on the primitive according to an embodiment of the disclosure. In order to generate coordinates on a display, a series of transformations are performed on a vertex position/coordinate of each primitive, as illustrated in FIG. 6. Each primitive of the input data Din may be multiplied by a model transformation matrix M for a model transformation. Through the model transformation, a primitive may be transformed from an object space (or a model space) 601 into a world space 602. The primitive belonging to the world space 602 may be multiplied by a view transformation matrix V for a view transformation. Through the view transformation, the primitive may be transformed from the world space 602 into a view space 603. The primitive belonging to the view space 603 may be multiplied by a projection transformation matrix for a projection transformation. The projection transformation is applied to achieve illusion of human eye, e.g., make a far thing look smaller. Through the projection transformation, the primitive may be transformed from the view space 603 into a projection space 604, which is also referred to as a clip space. The primitive belonging to the projection space 604 may be multiplied by a normalization transformation matrix for a normalization transformation. Through the normalization transformation, the primitive may be transformed from the projection space 604 into a normalized space 605. The primitive belonging to the normalized space 605 may be multiplied by a viewport transformation matrix for a viewport transformation. Through the viewport transformation, the primitive may be transformed from the normalized space 605 into a display space 606. Details of performing different spatial transformations on the primitive as described in FIG. 6 may refer to the description provided by the Open Graphics Library (OpenGL) and will not be repeated herein.

Figure 7:
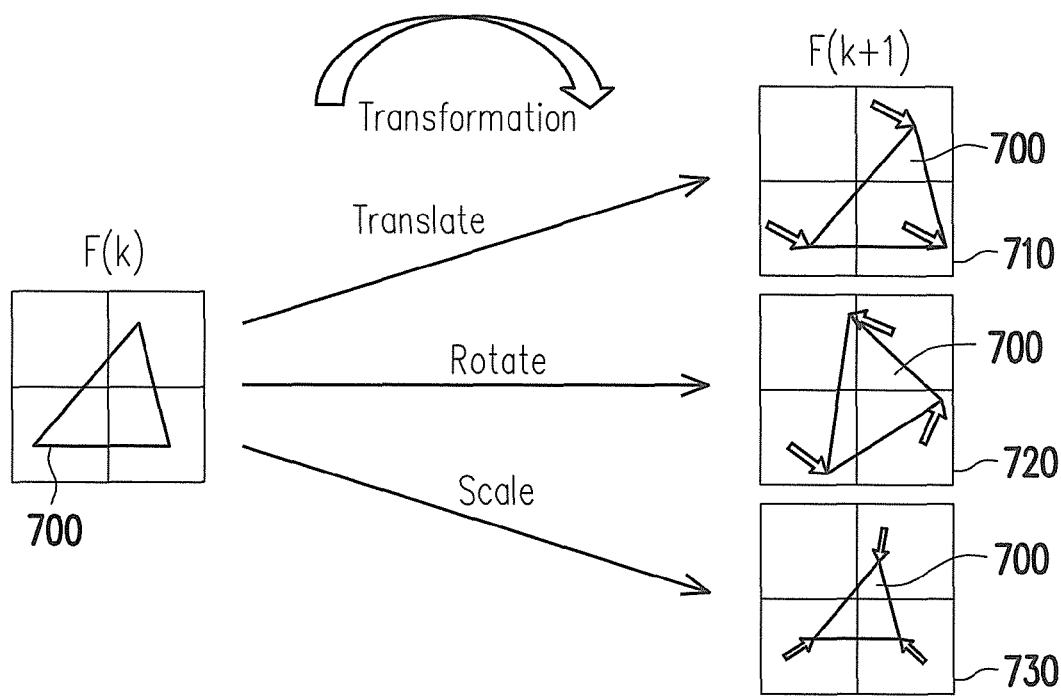
FIG. 7 is a schematic diagram illustrating different types of spatial transformations of the transformation matrix according to an embodiment of the disclosure.

FIG. 7 is a schematic diagram illustrating different types of spatial transformations of the transformation matrix according to an embodiment of the disclosure. FIG. 7 illustrates a previous frame F(k) at the left and a current frame F(k+1) at the right. The transformations of a primitive include translating, rotating and scaling. For instance, if a translate transformation occurs to a primitive 700 of the previous frame F(k), a position of the transformed primitive 700 in the current frame F(k+1) may be presented as a current frame 710. The arrows shown in the current frame 710 represents motion vectors of the primitive vertices. If a rotate transformation occurs to the primitive 700 of the previous frame F(k), a position of the transformed primitive 700 in the current frame F(k+1) may be presented as a current frame 720. The arrows shown in the current frame 720 represents motion vectors of the primitive vertices. If a scale transformation occurs to the primitive 700 of the previous frame F(k), a size of the transformed primitive 700 in the current frame F(k+1) may be presented as a current frame 730. The arrows shown in the current frame 730 represents motion vectors of the primitive vertices.

The checker 111 may calculate a motion vector of each primitive in the current frame of the input data Din. For example (but not limited to), the checker 111 may multiply the model transformation matrix M with the view transformation matrix V to obtain a transformation matrix [MV] and, obtains a motion vector of the primitive from the transformation matrix [MV]. The checker checks whether a motion state of a primitive in the current frame belongs to a "translation-dominate" motion. For example (but not limited to), the checker 111 may calculate $X=A^{-1}B$, where A represents a transformation matrix [MV] of the primitive in the previous frame, B represents a transformation matrix [MV] of the primitive in the current frame, and X represents a difference between the transformation matrices A and B. The checker 111 may determine whether the motion state of the primitive in the current frame belongs to the "translation-dominate" motion according to a pattern of the matrix X. The determination of the pattern of the matrix X may refer to section 2.10.2 of the OpenGL ES specification (i.e., Common/Common-Lite Profile Specification Version 1.1.12) and will not be described any further. The checker 111 may check whether the transformation matrix of the drawing command is "translation-dominate" and correspondingly set a flag in step S231.

The tiling engine 112 is coupled to the checker 111. The tiling engine 112 is configured to receive the input data Din and divide the current frame of the input data Din into one or more tiles (step S220). For example (but not limited to), the tiling engine 112 may perform clipping culling functions on each primitive. The tiling engine 112 may perform a viewport transformation on a coordinate of each primitive, and generate a screen coordinate. The tiling engine 112 may sort each primitive by using the tiles and at last store a new primitive list and vertex data in a parameter buffer. Before entering the next stage, the tiling engine 112 may process all primitive of a frame.

The tile comparator 113 is coupled to the tiling engine 112 and the repository 114. The repository 114 is configured to store transformation matrices, such as transformation matrices of the drawing commands generated by the geometry processing module 412. The tile comparator 113 receives data with respect to each tile from the tiling engine 112 and receives the corresponding transformation matrices from the repository 114. According to a motion vector of a primitive of a current tile among a plurality of tiles, the tile comparator 113 may check the motion state of the current tile in step S232. In the embodiment illustrated in FIG. 5 (but not limited thereto), step S232 includes sub-steps S510 and S520.

In step S510, whether the motion state of the primitive of the current tile belongs to the "translation-dominate" motion is determined. For example (but not limited to), the tile comparator 113 may determine whether the motion state of the primitive in the current tile belongs to the "translation-dominate" motion according to the flag set by the checker 111. In case the motion state of any one of the primitives in the current tile does not belong to the "translation-dominate" motion, the tile comparator 113 determines that the current tile is a tile to be rendered. When the current tile is determined as a tile to be rendered, the post processing function of the post-stage processing circuit 120 may be enabled. Namely, the post-stage processing circuit 120 may perform the post processing on the current tile, and generate a processed current tile of the current frame (step S240). In step S240, the post-stage processing circuit 120 may render the current tile to the tile buffer 122 and write it out to the frame memory 130.

Figure 8:
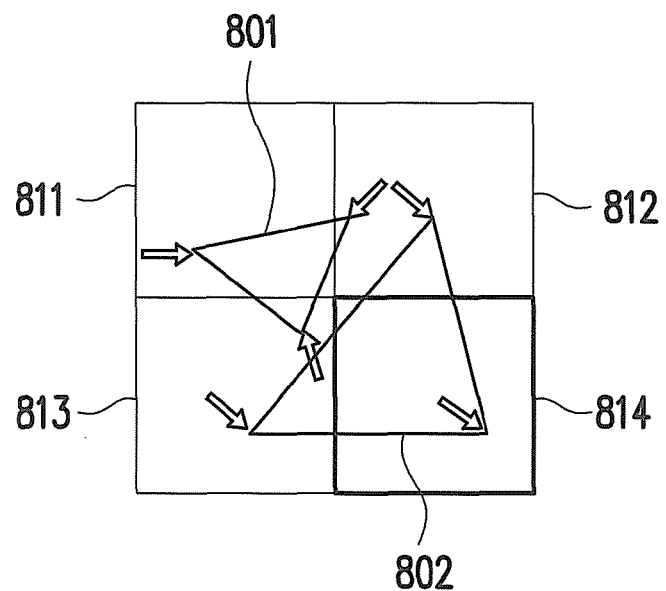
FIG. 8 is a schematic diagram illustrating an example of the determination operation of step S510 depicted in FIG. 5 according to an embodiment of the disclosure.

For instance, FIG. 8 is a schematic diagram illustrating an example of the determination operation of step S510 depicted in FIG. 5 according to an embodiment of the disclosure. An image frame illustrated in FIG. 8 includes primitives 801 and 802, and the image frame is divided into tiles 811, 812, 813 and 814. According to transformation matrices of the primitives 801 and 802, motion vectors of vertices of the primitives 801 and 802 may be obtained, as schematically represented by arrows in FIG. 8. The checker 111 may check the transformation matrices of drawing commands in step S231, and determine that the transformation of the primitive 801 is "scaling-dominate", and the transformation of the primitive 802 is "translation-dominate". The tile comparator 113, in step S510, may determine that the motion state of the primitive 801 in the tile 811 does not belong to a "translation-dominate" motion. The post-stage processing circuit 120, in step S240, may perform post processing (e.g., the rasterization operation) on the tiles 811. In this case, the motion state of the primitive 802 in the tile 812 belongs to the "translation-dominate" motion, but the motion state of the primitive 801 in the tile 812 does not belong to the "translation-dominate" motion, and the post-stage processing circuit 120 may perform the post processing on the tile 812 in step S240. The tile 813 is similar to the tile 812, and the post-stage processing circuit 120 may perform the post processing on the tile 813 in step S240. In step S510, the tile comparator 113 may determine that the motion state of each primitive (e.g., the primitive 802) in the tile 814 belongs to the "translation-dominate" motions and therefore, proceed to step S520.

When the motion states of all the primitives in the current tile belong to the "translation-dominate" motions, the tile comparator 113 performs step S520 to check the motion vector of each primitive in the current tile is less than a threshold TH. For instance, the tile comparator 113 check whether all the motion vectors of the drawing commands in the current tile are less than a specific threshold TH. The threshold TH may be 10 pixels or less. If all the motion vectors of the drawing commands in the current tile are less than the specific threshold TH, the tile comparator 113 may determine that the current tile is not a tile to be rendered. When the current tile is determined as a tile requiring no rendering, the post-stage processing circuit 120 may serve a processed corresponding tile of the previous frame as the processed current tile of the current frame (step S250). For instance, the post processing function (e.g., the rasterization operation) of the post-stage processing circuit 120 may be disabled, and the corresponding tile of the previous frame is copied to the current frame, and the related rendering computation may be omitted.

When one or more primitives in the current tile have motion vectors greater than the threshold, a new primitive (e.g., another side surface of an article/object) may probably appear in the current tile, and the tile comparator 113 has to determine whether the current tile is a tile to be rendered. When the current tile is determined as a tile to be rendered, the post-stage processing circuit 120 may perform the post processing on the current tile to generate a processed current tile of the current frame (step S240). For instance, the post processing function (e.g., the rasterization operation) of the post-stage processing circuit 120 may be enabled, and the post-stage processing circuit 120 may render the current tile to the tile buffer 122 and write it out to the frame memory 130.

In the data-processing apparatus and the operation method thereof introduced by the embodiments of the disclosure, before performing the post processing whether to serve the processed corresponding tile of the previous frame as the processed current tile of the current frame is determined according to the motion state of the current tile, and the post processing of the processed current tile of the current frame can be saved (i.e., the tile computation/rendering can be saved). Therefore, the data-processing apparatus and the operation method thereof can contribute to save the tile computation as early as possible before performing the post processing.

In light of the foregoing, the embodiments of the disclosure introduce a data-processing apparatus and an operation method thereof capable of saving computation of tiles as early as possible in the process of graphics rendering pipeline by using motion vectors. The motion vectors may be obtained by calculating the parameters and the vertex data. In the embodiments of the disclosure, the computation of the current tile may be eliminated based on the knowledge/information with respect to the parameters and the transformation matrices of the tiles in the current frame and the corresponding tiles in the previous frame. If a corresponding tile which is the same as or similar to the current tile of the current frame exists in the previous frame, the rendering computation of the current tile of the current frame can be omitted. The embodiments of the disclosure introduce a method to achieve efficiently saving the computation from being performed on duplicated tiles by means of utilizing parameters (e.g., motion vectors) on each tile-based GPU), and save computation and save traffic bandwidth between the system and each GPU. In the embodiments of the disclosure, the positions are determined before the rasterization stage, and the data used by the determination mechanism is the data already available in each GPU. In occasions where dynamic scenes are to be rendered, the embodiments of the disclosure can facilitate in eliminating duplicated tiles.

It will be clear to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A data-processing apparatus, comprising:
   a tiling circuit, configured to receive input data, divide a current frame of the input data into at least one tile and check a motion state of a current tile among the at least one tile, wherein the tiling circuit comprises a checker, a tiling engine and a tile comparator, the checker is configured to multiply a model transformation matrix M of a primitive in the current frame of the input data with the view transformation matrix V of the primitive in the current frame of the input data to obtain a transformation matrix [MV], the checker obtains a motion vector of the primitive from the transformation matrix [MV], the checker calculates a matrix $X=A^{-1}B$, where A represents the transformation matrix [MV] of the primitive in the previous frame, B represents the transformation matrix [MV] of the primitive in the current frame, and the checker checks whether a motion state of the primitive in the current frame belongs to a translation-dominate motion according to a pattern of the matrix X, the tiling engine is coupled to the checker, the tiling engine is configured to receive the input data and divide the current frame of the input data into the at least one tile, the tile comparator is coupled to the tiling engine to receive the at least one tile, and the tile comparator is configured to check the motion state of the current tile among the at least one tile according to the motion vector of the primitive in the current tile; and
   a post-stage processing circuit, coupled to the tiling circuit to receive the current tile, wherein the post-stage processing circuit determines to perform a post processing that comprising rasterizing on the current tile to generate a processed current tile of the current frame or to obtain a processed corresponding tile of a previous frame to serve the processed corresponding tile of the previous frame as the processed current tile of the current frame, according to the motion state of the current tile.

2. The data-processing apparatus according to claim 1, wherein the input data comprises graphics data.

3. The data-processing apparatus according to claim 1, further comprising:
   a preceding-stage processing circuit, coupled to the tiling circuit and configured to provide the input data.

4. The data-processing apparatus according to claim 3, wherein the preceding-stage processing circuit comprises a programmable application interface and a geometry processing module.

5. The data-processing apparatus according to claim 4, wherein the geometry processing module comprises a programmable vertex shader and a geometry engine.

6. The data-processing apparatus according to claim 1, wherein when the motion state of the at least one primitive in the current tile does not belong to the translation-dominate motion, the tile comparator determines that the current tile is to be rendered; and when the current tile is determined to be rendered, the post-stage processing circuit performs the post processing on the current tile to generate the processed current tile of the current frame.

7. The data-processing apparatus according to claim 1, wherein when the motion state of the at least one primitive in the current tile belongs to the translation-dominate motion, the tile comparator checks whether all the motion vectors of the at least one primitive in the current tile is less than a threshold, and determine whether the current tile is to be rendered; and when the current tile is determined as not to be rendered, the post-stage processing circuit obtains the processed corresponding tile of the previous frame to serve the processed corresponding tile of the previous frame as the processed current tile of the current frame.

8. The data-processing apparatus according to claim 1, wherein the post-stage processing circuit comprises a rasterization engine.

9. An operation method of a data-processing apparatus, comprising:
   multiplying, by a checker, a model transformation matrix M of a primitive in a current frame of input data with the view transformation matrix V of the primitive in the current frame of the input data to obtain a transformation matrix [MV];
   obtaining, by the checker, a motion vector of the primitive from the transformation matrix [MV];
   calculating a matrix $X=A^{-1}B$ by the checker, where A represents the transformation matrix [MV] of the primitive in the previous frame, B represents the transformation matrix [MV] of the primitive in the current frame;
   checking, by the checker, whether a motion state of the primitive in the current frame belongs to a translation-dominate motion according to a pattern of the matrix X;
   dividing the current frame of the input data into at least one tile by a tiling engine of a tiling module;
   checking a motion state of the current tile among the at least one tile by a tile comparator of the tiling module according to the motion vector of the primitive in the current tile; and
   determining to perform a post processing that comprising rasterizing on the current tile by a post-stage processing module to generate a processed current tile of the current frame or to obtain a processed corresponding tile of a previous frame by the post-stage processing module to serve the processed corresponding tile of the previous frame as the processed current tile of the current frame, according to the motion state of the current tile.

10. The operation method according to claim 9, wherein the input data comprises graphics data.

11. The operation method according to claim 9, further comprising:
    performing preceding-stage processing by a preceding-stage processing module to provide the input data.

12. The operation method according to claim 9, further comprising:
    when the motion state of the at least one primitive in the current tile does not belong to the translation-dominate motion, determining by the tile comparator that the current tile is to be rendered; and
    when the current tile is determined to be rendered, performing the post processing on the current tile by the post-stage processing module to generate the processed current tile of the current frame.

13. The operation method according to claim 9, wherein the step of checking the motion state of the current tile comprises:
- when the motion state of the at least one primitive in the current tile belongs to the translation-dominate motion, checking by the tile comparator whether all the motion vectors of the at least one primitive in the current tile are less than a threshold to determine whether the current tile is to be rendered; and
- when the current tile is determined as not to be rendered, obtaining the processed corresponding tile of the previous frame by the post-stage processing module to serve the processed corresponding tile of the previous frame as the processed current tile of the current frame.

* * * * *